United States Patent [19]

Teramachi

[11] Patent Number: 4,542,661
[45] Date of Patent: Sep. 24, 1985

[54] ROTARY-TO-LINEAR CONVERTER WITH ROLLING BALLS, AND TWO-SPEED FEED MECHANISM INCORPORATING THE SAME

[76] Inventor: Hiroshi Teramachi, 2-34-8, Higashi-Tamagawa, Setagaya-Ku, Tokyo, Japan

[21] Appl. No.: 447,254

[22] Filed: Dec. 6, 1982

[30] Foreign Application Priority Data

Dec. 4, 1981 [JP] Japan .................................. 56-195356
Dec. 24, 1981 [JP] Japan .................................. 56-216206
Dec. 24, 1981 [JP] Japan .................................. 56-216207

[51] Int. Cl.⁴ .......................... F16H 1/18; F16H 1/20; F16H 55/18; F16H 27/02
[52] U.S. Cl. ............................ 74/424.8 NA; 74/89.15; 74/424.8 R; 74/441
[58] Field of Search ................. 74/424.8 NA, 89.15, 74/89.14, 409, 441, 440, 216.3, 424.8 A, 424.8 R

[56] References Cited

U.S. PATENT DOCUMENTS

| | | | |
|---|---|---|---|
| 2,076,180 | 4/1937 | Griswold | 74/424.8 NA |
| 2,711,655 | 6/1955 | Schottler | 74/424.8 NA |
| 2,739,491 | 3/1956 | Russell | 74/424.8 NA |
| 2,936,645 | 5/1960 | Morris et al. | 74/441 |
| 2,978,920 | 4/1961 | Sears et al. | 74/424.8 R |
| 3,393,577 | 7/1968 | Better | 74/424.8 R |
| 4,000,664 | 1/1977 | Christensen | 74/424.8 R |
| 4,346,728 | 8/1982 | Sulzer | 74/89.15 |
| 4,438,986 | 3/1984 | Teramachi | 74/424.8 B |

FOREIGN PATENT DOCUMENTS

| | | | |
|---|---|---|---|
| 450824 | 8/1948 | Canada | 74/424.8 NA |
| 54-120366 | 9/1979 | Japan | 74/424.8 NA |

Primary Examiner—Lawrence J. Staab
Assistant Examiner—Michael D. Bednarek
Attorney, Agent, or Firm—Armstrong, Nikaido, Marmelstein & Kubovcik

[57] ABSTRACT

An assembly of a worm and a ball nut, with a multiplicity of antifriction balls rollably engaged therebetween and retained in preassigned relative positions by a tubular cage, to cause relative longitudinal displacement of either of the worm and the ball nut in response to the rotation of the other. At least one turn of the internal thread at the midportion of the ball nut differs in width from the other turns for preloading the balls on its opposite sides in the opposite axial directions of the worm with a view to minimal backlash between worm and ball nut. Also disclosed is a two-speed feed mechanism incorporating a wormshaft having first and second threaded portions with different leads on which are mounted first and second ball nuts, respectively, via caged, preloaded antifriction balls. The first ball nut is rotatably mounted to a stationary part via a bearing whereas the second ball nut is fastened to an object such as a worktable. One end of the wormshaft is straight-splined and received in a ball bushing which admits of axial motion of the wormshaft while being constrained to simultaneous rotation therewith. Thus, with the rotation of the wormshaft, the second ball nut travels linearly at either of two different speeds depending upon whether the first ball nut is restrained from rotation or coupled to the ball bushing for joint rotation therewith.

15 Claims, 10 Drawing Figures

ROTARY-TO-LINEAR CONVERTER WITH ROLLING BALLS, AND TWO-SPEED FEED MECHANISM INCORPORATING THE SAME

BACKGROUND OF THE INVENTION

The present invention pertains to a device for converting rotary motion into rectilinear motion, and more specifically to such a rotary-to-linear converter of the type having a worm and a ball nut with a plurality or multiplicity of antifriction balls rollably interposed therebetween. The invention also specifically deals with a two-speed feed mechanism built on the novel rotary-to-linear conversion scheme.

The combination of a worm and a ball nut with interposed steel balls has found extensive use for feed motions and other purposes. The balls convert sliding friction into rolling friction and thus afford smooth back-and-forth travel of either of the worm and the ball nut with the bidirectional rotation of the other or of the same part. As heretofore constructed, however, the worm-and-ball-nut assembly has had one drawback arising from the movement of the balls. The conventional principle has been to "recirculate" the balls; that is, they return from each end of the ball nut to the other through a tubular return guide after making, for instance, one and a half to three turns around the worm. Such recirculation of the balls gives rise to considerable noise.

Another objection to the prior art concerns the backlash between the worm and the ball nut, due to the presence of axial clearances between worm and balls and between ball nut and balls. The backlash is a common cause of (1) the uneven wear of the relatively moving parts, (2) noise, and (3) a delay with which either of the worm and the ball nut starts moving axially in response to the rotation of the other. It has been suggested for the elimination of the backlash to split the ball nut into two halves and to place a spacer therebetween. When mounted in place, the ball nut assembly is preloaded in a direction of either axial compression or expansion. This known solution is still unsatisfactory because the ball nut assembly must be of sufficiently sturdy make to withstand the stresses exerted thereon at the time of mounting. The preloading of the ball nut assembly is also in itself a trouble.

The conventional worm-and-ball-nut assembly has the additional disadvantage of admitting ready intrusion of dust and other foreign matter into the ball-receiving space between worm and ball nut from both ends of the latter. Accumulating on the threaded surfaces of the worm and the ball nut, such foreign matter impedes the smooth rolling of the balls and, in consequence, the smooth relative motion of the worm and the ball nut.

The worm-and-ball-nut assembly in accordance with the invention finds typical applications in the feed mechanisms of machine tools and other pieces of machinery. In such applications the need often arises for rotatably mounting the ball nut to some fixed part. The usual conventional practice to this end has been to place between the ball nut and the fixed part an antifriction bearing comprising two concentric rings and rolling elements, normally balls, therebetween. The use of the separate bearing is objectionable because of the additional installation space required.

A variety of mechanisms have been proposed and used for feeding, for example, cutting tools, worktables or work itself at extremely low speed and moving them back at higher speed on a return stroke. Examples include step pulley arrangements with or without gears, variable ratio gear trains, differential gearing, and variable ratio friction drives. These known feed mechanisms are mostly bulky, complex in construction, and not necessarily well adapted for feeding a desired object in a manner suitable for precision tooling.

SUMMARY OF THE INVENTION

Summarized in its simplest form, the invention provides a rotary-to-linear converter comprising a worm, an internally screw-threaded ball nut sleeved thereon, and a plurality of antifriction balls rollably engaged between the threads of the worm and the ball nut to cause relative axial motion of either in response to the rotation of the other. At least one turn of the internal thread at the midportion of the ball nut is made different (greater or smaller) in width from the other turns so that the balls on the opposite sides of this thread turn are preloaded in the opposite axial directions of the worm, with the consequent elimination of backlash or looseness between the worm and the ball nut. Also included is a cage for rollably holding the preloaded balls in preassigned relative positions.

As indicated in the foregoing summary, the balls are retained in their preassigned relative positions by the cage, which preferably takes the form of a tube perforated to loosely receive the balls. The cage makes unnecessary the provision of the ball return guides required by the conventional devices of the recirculating ball type. The result is substantial reduction of noise in operation.

The invention as summarized above also features the preloading of the balls merely by making one turn of the internal thread of the ball nut different in width from the other turns. Thus preloaded, the balls practically eliminate endwise play between worm and ball nut. The absence of the endwise play is a prerequisite for the quick response with which either of the worm and the ball nut starts traveling axially upon revolution of the other, and with which the axially moving part changes direction upon change in the rotative direction of the other part. The preloading of the balls also serves to enhance the stiffness of the rotary-to-linear converter as a whole, so that the major moving parts can be accurately positioned one with respect to the other in use. Uneven wear of the parts is also avoided, resulting in a longer useful life of the device. It will be appreciated that the invention necessitates no extra means, in addition to the listed essential components of the rotary-to-linear converter, for preloading the balls and so makes easier the manufacture and assemblage of the device then hitherto.

In a preferred embodiment the ball nut has a pair of tubular extensions projecting coaxially from its opposite ends and each terminating in an inwardly turned rim slidably engaged with the thread of the worm. The ball nut extensions have their inside surfaces unthreaded and adapted for rolling contact with the balls and so serve to lengthen the stroke of the axial motion of the worm relative to the ball nut without correspondingly increasing the axial dimension of the ball nut proper. The ball nut proper of such reduced axial dimension is advantageous in view of the greater accuracy with which it can be tapped. The inwardly turned rims on the distal ends of the ball nut extensions offer the additional advantage of sealing the ends against intrusion of foreign matter, thus assuring smooth rolling motion of the worm and the ball nut relative to each other.

An additional feature of the invention resides in an antifriction bearing forming a part of the rotary-to-linear converter, for use in rotatably mounting the ball nut to some fixed part in the use of the converter. The bearing makes use of the ball nut itself as the inner ring. Consequently the external diameter of this bearing can be much less than in cases where a self-contained bearing is placed around the ball nut. The bearing of such reduced external diameter is of course advantageous in those applications of the inventive device where its installation spaces are very narrowly confined.

According to another aspect of the invention there is provided a two-speed feed mechanism including a wormshaft having first and second threaded portions, with a difference in lead, and a splined portion. Sleeved upon the first and second threaded portions are first and second ball nuts, respectively, each via a group of caged antifriction balls which are preloaded as in the foregoing. The first ball nut is rotatably mounted to some stationary part via a bearing, preferably of the above explained construction utilizing the ball nut as its inner ring, and is thereby locked against endwise motion. The second ball nut, on the other hand, is coupled to an object to be fed and is thereby restrained from rotation. Fitted over the splined portion of the wormshaft is a ball bushing which admits of the axial motion of the wormshaft but which is constrained to joint rotation therewith.

Thus, as the wormshaft is revolved via the ball bushing, the second ball nut travels linearly, together with the object thereon, along the wormshaft at either of two different speed depending upon whether the first ball nut is restrained from rotation or coupled to the ball bushing for joint rotation therewith. Let it be assumed that the wormshaft revolves at the same speed in either case. Then the speed of the axial motion of the second ball nut corresponds to the difference between the leads of the first and second threaded portions of the wormshaft when the first ball nut is locked against rotation, and only to the lead of the second threaded portion when the first ball nut is coupled to the ball bushing for joint rotation therewith.

The two-speed feed mechanism can of course incorporate, and derive the full benefits from, all the novel features of the invention set forth above in conjunction with its simplest form. Additionally, in this feed mechanism, the ball bushing has its balls preloaded to avoid looseness between bushing and wormshaft in either direction of rotation. This fact, combined with the elimination of axial play between the wormshaft and the two ball nuts thereon, makes the feed mechanism highly responsive in operation and durable in construction.

The above and other features and advantages of this invention and the manner of attaining them will become more apparent, and the invention itself will best be understood, from a study of the following description and appended claims, with reference had to the attached drawings.

DESCRIPTION OF THE PREFERRED EMBODIMENT

Figure 1:
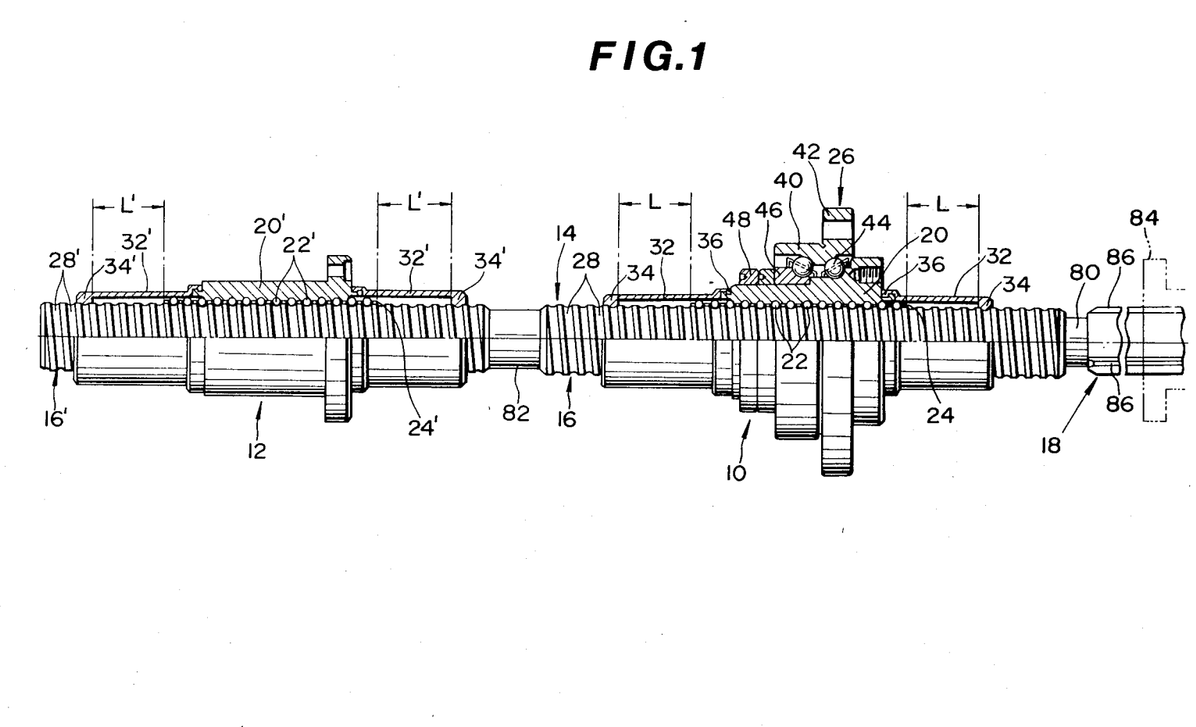
FIG. 1 is an axial section, partly drawn in elevation for clarity, through the most fundamental components of the two-speed feed mechanism embodying the principles of the present invention, the feed mechanism essentially incorporating two rotary-to-linear converters of the worm-and-ball-nut type in accordance with the invention.

The invention will now be described more specifically as embodied in a mechanism for rectilinearly feeding a desired object (e.g., work or a tool acting thereon) at a very low speed and moving the object back on a return stroke at a much higher speed. The two speed feed mechanism must integrally comprise two rotary-to-linear converters, as identified by the reference numerals 10 and 12 in FIG. 1, each representing the fundamental concepts of the invention. The dual rotary-to-linear converter assembly, so to say, of FIG. 1 broadly comprises:

1. A wormshaft 14 having first 16 and second 16' externally screw-threaded portions and a straight-splined portion 18.
2. First 20 and second 20' ball nuts sleeved upon the first 16 and second 16' threaded portions, respectively, of the wormshaft 14.
3. First 22 and second 22' groups of antifriction balls interposed between the wormshaft 14 and the first 20 and second 20' ball nuts respectively.
4. First 24 and second 24' cages for the respective groups of antifriction balls 22 and 22'.
5. A double-row ball bearing 26 on the first ball nut 20.

The first rotary-to-linear converter 10 (exclusive of the bearing 26) and the second 12 are of like construction except for the leads of the threaded portions 16 and 16' and the shapes of the ball nuts 20 and 20'. The first threaded portion 16 has a greater lead than that of the second 16'. The first ball nut 20 has an external shape adapted to carry the bearing 26. Since the two converters 10 and 12 are identical in other respects, only the first converter 10 will be discussed in detail with reference to FIGS. 2 and 3, it being understood that the same discussion applies to the second converter 12. The various parts of the this second converter will be identified merely by priming the reference numerals used to denote the corresponding parts of the first converter 10.

Figure 2:
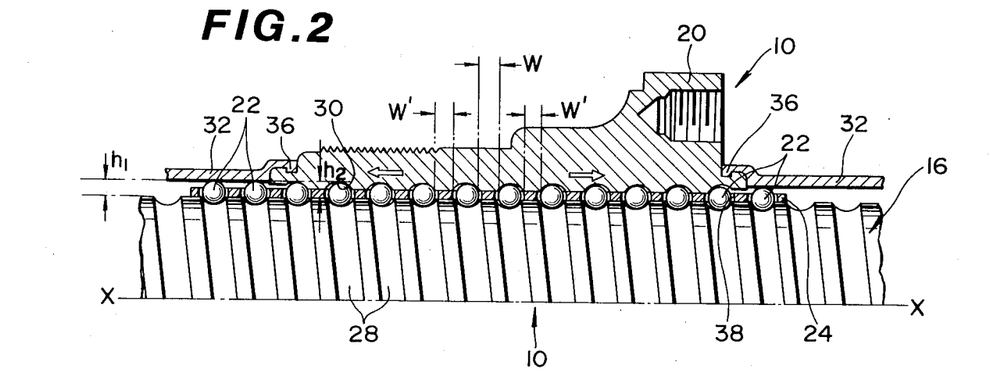
FIG. 2 is an enlarged, fragmentary axial section through one of the rotary-to-linear converters in the feed mechanism of FIG. 1.

FIG. 2 is a more detailed illustration of the representative rotary-to-linear converter 10. It will be observed from this figure that the antifriction balls 22 are rollably engaged in the helical groove 28 in the threaded portion 16 of the wormshaft 14 and in the helical groove 30 cut in the inside surface of the ball nut 20. The balls roll in these grooves and act to frictionlessly translate the rotation of the wormshaft 14 into the relative axial motion of the ball nut 20 (or vice versa).

The antifriction balls 20 must be preloaded for the elimination of backlash between wormshaft 14 and ball nut 20. Toward this end the invention contemplates to make the width W of at least one turn of the internal thread at the midpoint of the ball nut 20, with respect to its axial dimension, different from the width W' of any other turn of the thread on its opposite sides. In the illustrated embodiment the W is greater than W'. Thus the two groups of balls on the opposite sides of the greater-width thread turn are preloaded generally in the opposite axial directions of the wormshaft, away from each other.

Alternatively the width W of the thread turn at the midpoint of the ball nut 20 may be made less than the width W' of any other turn. In this case the two groups of balls on its opposite sides will be preloaded toward each other along the wormshaft. All that is required for the attainment of the purposes of the invention is to preload some and the others of the balls in the opposite axial directions of the wormshaft.

Both FIGS. 1 and 2 reveal that the ball nut 20 has a pair of tubular extensions 32 extending concentrically from its opposite axial ends. Each ball nut extension 32 terminates in an inwardly turned, annular rim 34 slidably engaged with the thread of the wormshaft 14. The ball nut extensions 32 are rigidly coupled at 36 to the ball nut proper 20.

As indicated in FIG. 2, the radial distance h1 between the unthreaded inside surface of each ball nut extension 32 and the crests of the thread on the wormshaft 14 equals the radial distance h2 between the roots of the thread on the ball nut 20 and the crests of the thread on the wormshaft. That is to say that the inside surfaces of the ball nut extensions 32 are at exactly the same distance from the axis X—X of the wormshaft 14 as the roots of the thread on the inside surface of the ball nut 20. Hence, with the relative longitudinal displacement of the wormshaft 14 and the ball nut 20, the balls 22 can smoothly roll out of the groove 30 in the ball nut proper into contact with the inside surface of each ball nut extension 32, and back into the groove 30. It will be seen that the balls are preloaded as above only when caught between wormshaft 14 and ball nut proper 20, and are not loaded as they roll out of the latter. The ball nut extensions 32 are well calculated to allow smooth transition of the balls between the loaded and unloaded regions.

Figure 3:
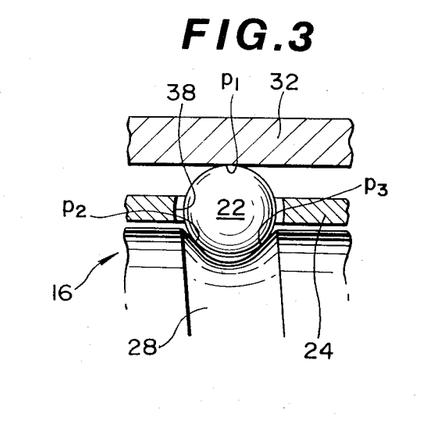
FIG. 3 is a still more enlarged, fragmentary axial section through each rotary-to-linear converter in the feed mechanism of FIG. 1, the view being explanatory of the way in which each antifriction ball makes rolling engagement with the wormshaft and one of the unthreaded extensions of the ball nut.

FIG. 3 clearly illustrates that, in the unloaded region, each ball 22 makes rolling contact with the inside surface of either ball nut extension 32 at a point P1 and with the opposed flanks of the thread on the wormshaft 14 at points P2 and P3. Thus positively supported each at three points, the balls 22 can roll even without being guided by the ball nut groove 20. It will have been seen, then, that the pair of ball nut extensions 32 serves to extend the stroke of the relative longitudinal motion of the wormshaft 14 and ball nut 20 without correspondingly increasing the axial dimension of the internally threaded nut proper. The terminal rims 34 of the ball nut extensions perform the additional function of preventing dust intrusion into the ball nut.

The cage 24 seen in FIGS. 1, 2 and 3 takes the form of a tube having an inside diameter slightly more than the outside diameter of the threaded portion 16 of the wormshaft 14 and an outside diameter slightly less than the inside diameter of the threaded ball nut 20. The tubular cage 24 has formed therein a multiplicity of bores 38 receiving the respective antifriction balls 22 with clearances, thereby retaining the balls in the preassigned relative positions (as shown also in FIG. 6).

What follows in the discussion of relative motions among the wormshaft 14, the ball nut 20, and the cage 24. Assume that the ball nut 20 is locked both against rotation and against endwise motion. If then the wormshaft 14 is revolved in either direction, the cage 24 will travel axially together with the wormshaft. Assume, on the other hand, that the wormshaft 14 is locked only against axial motion and that the ball nut 20 is locked only against rotation. Then the rotation of the wormshaft 14 will result in the axial motion of the cage 24 together with the ball nut. In short the cage 24 travels endwise with either of the wormshaft 14 and ball nut 20 which is actually moving axially in relation to the other.

Thus, in the endwise travel of the cage 24 together with the wormshaft 14 relative to the fixed ball nut 20, the rims 34 of the ball nut extensions 32 set limits on the stroke of the wormshaft. In FIG. 1 the letter L represents the distance between either extremity of the cage 24 and the inside surface of the corresponding one of the ball nut extension rims 34. The sum of the two distances L is the allowed total stroke of the linear motion of the wormshaft 14 relative to the ball nut 20 when the latter is fixed.

Figure 4:
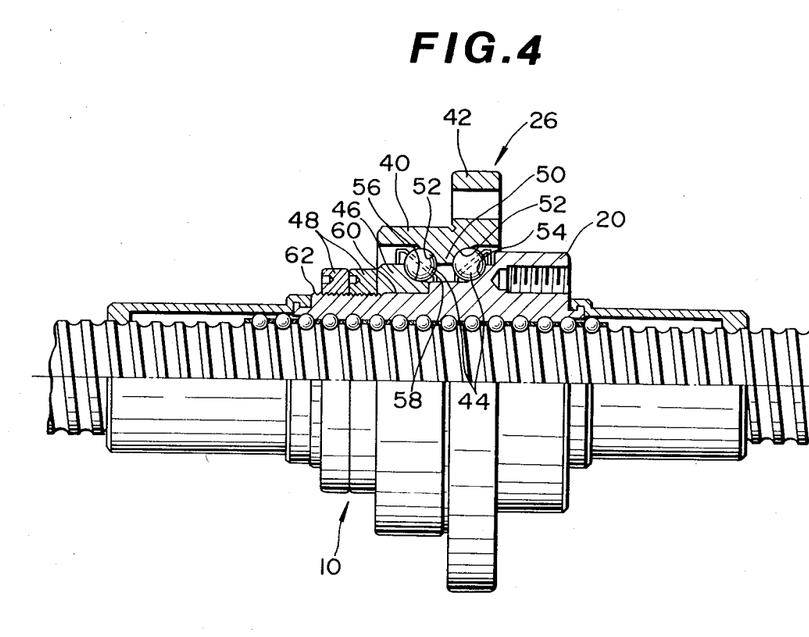
FIG. 4 is an axial section, partly in elevation for clarity, through the rotary-to-linear converter of FIG. 2, additionally showing a double-row ball bearing mounted on the ball nut.

The two rotary-to-linear converters 10 and 12 as so far detailed are essentially identical, only with the two exceptions set forth previously. The following, then, is the description of the bearing 26 provided only to the first converter 10. Shown as being of the double-row ball type by way of example, the bearing 26 characteristically utilizes the first ball nut 20 as part of its inner ring. With reference directed principally to FIG. 4 the double-row ball bearing 26 additionally comprises:

1. An outer ring 40 complete with a mounting flange 42.
2. Two rows of balls (rolling elements) 44.
3. An inner ring segment 46 coacting with the ball nut 20 to serve as the inner ring.
4. A dual retainer nut 48 for retaining the inner ring segment 46 in place on the ball nut 20.

The outer ring 40 has an annular rib 50 projecting inwardly therefrom. Formed on the opposite sides of this rib are two races 52, generally cross-sectionally angled away from each other, for the respective rows of balls 44. The ball nut 20 has a race 54 for one row of balls 44 whereas the inner ring segment 46 has a race 56 for the other row of balls. It will be noted that the inner races 54 and 56 are generally cross-sectionally oriented toward the respective outer races 52. The balls 44 are confined between these outer races 52 and inner races 54 and 56. Cages 58 conventionally retain the balls in angularly spaced-apart positions.

The inner ring segment 46 is fitted over a reduced diameter portion 60 of the ball nut 20. This reduced diameter portion is externally screw-threaded at 62 for engaging the dual retainer nut 48 in abutment against the inner ring segment 46. The retainer nut 48 is intended to urge the inner ring segment 46 to the right, as viewed in FIG. 4. Thus urged axially by the retainer nut 48, the inner ring segment 46 coacts with the ball nut 20 and the outer ring 40 to preload the two rows of balls 44 toward each other. It will be appreciated that a simple turning of the dual retainer nut 48 on the ball nut 20 makes possible the preloading of the balls 44 against play.

Figure 5:
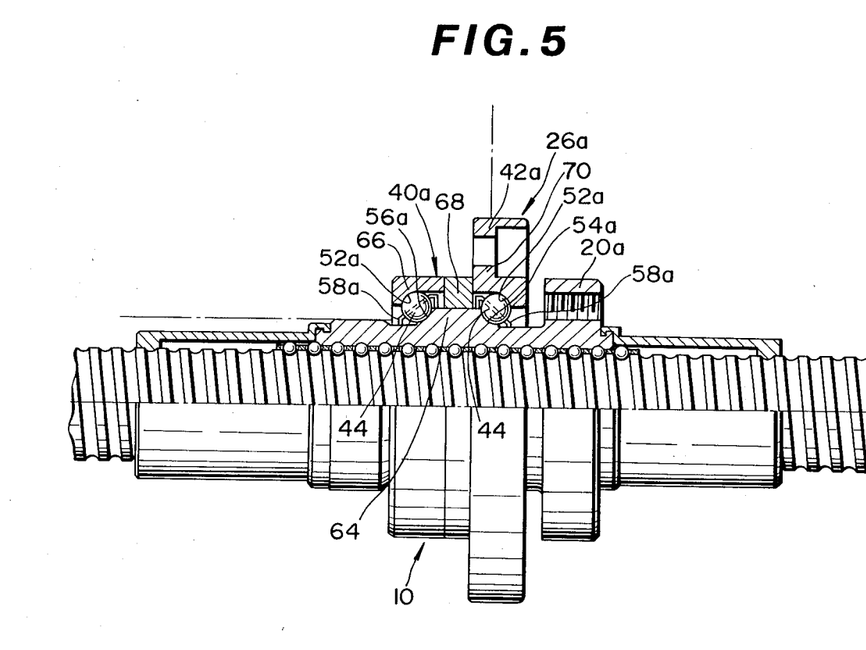
FIG. 5 is a view similar to FIG. 4 but showing an alternative form of the ball bearing.

FIG. 5 shows an alternative form of double-row ball bearing 26a. The ball nut 20a of the first rotary-to-linear converter 10 is slightly modified in shape to serve as the inner ring of the bearing 26a. It has an annular rib 64 projecting outwardly from its midportion. On the opposite sides of this rib there are formed a pair of races 54a and 56a for the two rows of balls 44 with cages 58a, with the races being generally cross-sectionally angled away from each other.

The outer ring 40a of the bearing 26a is split into three segments: (1) a left hand segment 66 having a race 52a; (2) a mid-segment 68 fitted over the ball nut rib 64; and (3) a right hand segment 70 having another race 52a and providing a mounting flange 42a. The two outer races 52a are of course cross-sectionally oriented toward the respective inner races 54a and 56a to rollably confine the balls 44 therebetween. The mid-segment 68 of the outer ring 40a is to have its thickness suitably determined in order that when the three outer ring segments 66, 68 and 70 are put together in place, they may coact with the ball nut or inner ring 20a to preload the two rows of balls 44 toward each other.

Figure 6:
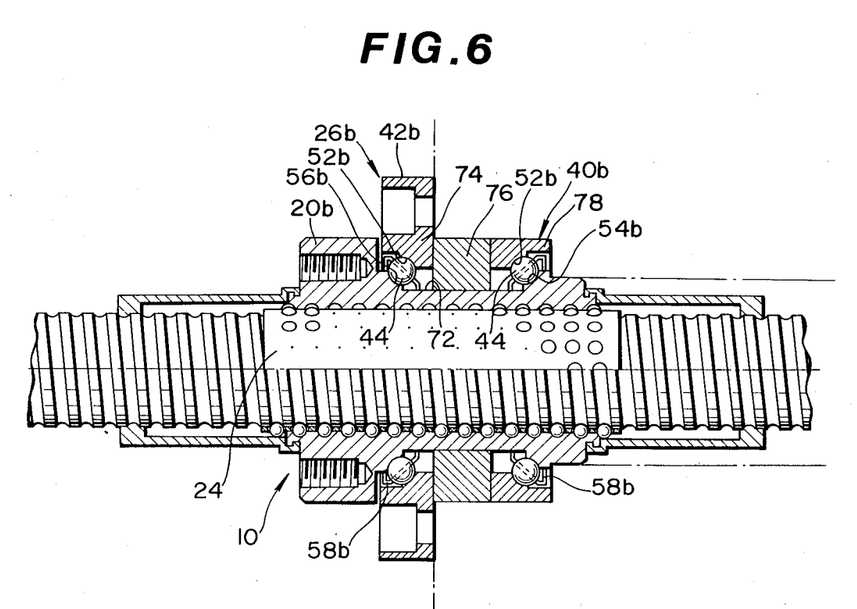
FIG. 6 is also a view similar to FIG. 4 but showing another alternative form of the ball bearing.

In FIG. 6 is given a further alternative form of double-row ball bearing 26b. The ball nut 20b of the first rotary-to-linear converter 10 has an annular recess 72 formed in its midportion. In the opposed side walls of the ball nut 20b bounding the annular recess 72 there are formed a pair of races 54b and 56b for the two rows of balls 44 with cages 58b. The races 54b and 56b are generally cross-sectionally angled toward each other.

As in the bearing 26a of FIG. 5 the outer ring 40b of the bearing 20b is split into three segments. These are (1) a left hand segment 74 having a race 52b and providing a mounting flange 42b, (2) a mid-segment 76 of two or more sections fitted over the bottom surface of the annular recess 72 in the ball nut 20b, and (3) a right hand segment 78 having another race 52b. The two outer races 52b are generally cross-sectionally oriented toward the respective inner races 54b and 56b.

In the assemblage of this bearing 26b the two outer segments 74 and 78 of the outer ring 40b may first be mounted on the inner ring or ball nut 20b via the respective rows of caged balls 44. Then the mid-segment 76 may be pressfitted between the outer ring segments 74 and 78 thereby causing the same to preload the two rows of balls 44 away from each other in coaction with the ball nut 20b. This embodiment offers the advantage of providing for fine adjustment of bearing preload.

It has been mentioned in connection with FIG. 1 that the wormshaft 14 has the straight-splined portion 18 at one end, adjoining the first threaded portion 16 with an intervening blank portion 80. (Another blank portion exists at 82 between the first 16 and second 16' threaded portions of the wormshaft.) Mounted on this splined portion of the wormshaft is a ball bushing 84, shown in details in FIGS. 7 and 8, which allows of the relative axial motion of the wormshaft in rolling contact therewith but which is constrained to joint rotation therewith in either direction. In the use of the dual rotary-to-linear converter assembly of FIG. 1 as a two-speed feed mechanism, the wormshaft 14 is to be revolved through the ball bushing 84.

Figure 7:
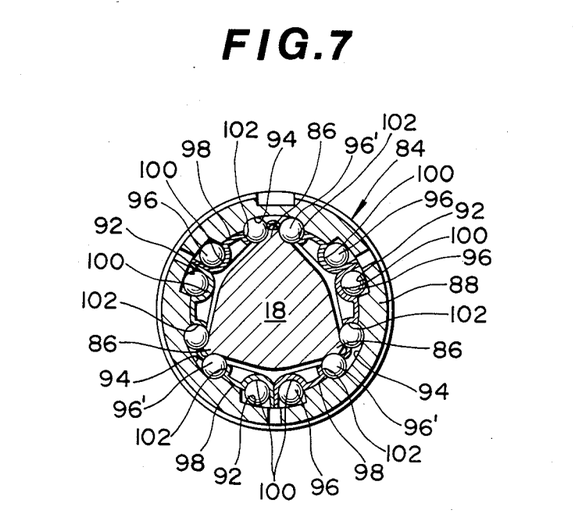
FIG. 7 is an enlarged cross section through the splined portion of the wormshaft in the feed mechanism of FIG. 1 and the ball bushing mounted thereon.
Figure 8:
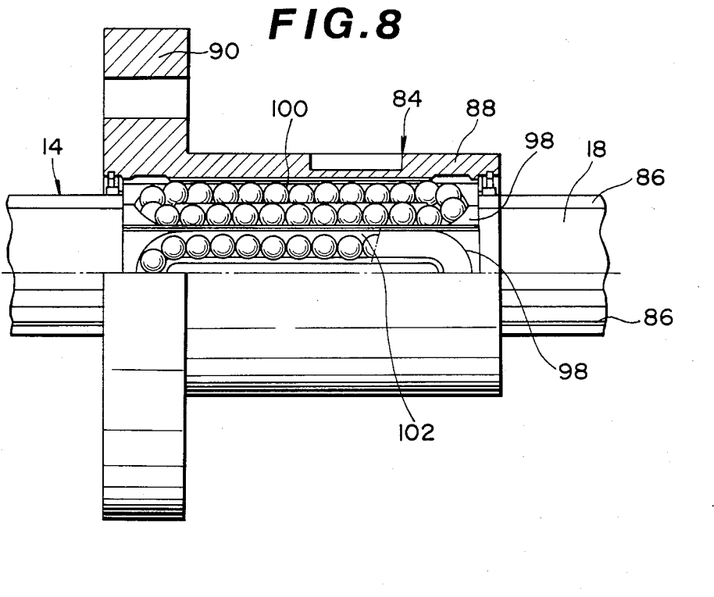
FIG. 8 is an axial section, partly in elevation for clarity, through the ball bushing of FIG. 7.

An inspection of FIG. 7 will reveal that the splined portion 18 of the wormshaft 14 is of substantially triangular cross-sectional shape, having three straight splines 86 at the apexes of the triangular, in this particular embodiment. Mounted on this splined portion is a bushing proper 88, complete with a mounting flange 90, FIG. 8, of the ball bushing 84. The bushing proper 88 has formed in its inside surface three comparatively deep guide grooves 92 and three shallower guide grooves 94 which extend longitudinally of the bushing and which alternate circumferentially. Each guide groove 92 accommodates two rows of nontorque balls 96 which do not take part in torque transfer from bushing proper 88 to wormshaft 14. Each guide groove 94, on the other hand, receive two rows of torque balls 96' which serve to transfer torque from bushing proper to wormshaft. The torque ball guide grooves 94 are cross-sectionally shaped as in FIG. 7 to serve as races for the torque balls 96'.

The relative angular positions of the splined wormshaft portion 18 and bushing proper 88 are such that the three straight splines 86 on the former are in register with the torque ball guide grooves 94 in the latter. Each spline 86 has its opposite sides concaved to serve as races for the longitudinal rolling motion of the corresponding two rows of torque balls 96'. The reference numeral 98 designates ball cages or guides defining grooves 100 and 102 for the axial rolling motion and recirculation of the nontorque balls 96 and torque balls 96'.

It is seen from the foregoing that upon rotation of the bushing proper 88 in either direction, the torque balls 96' act to transmit the torque to the splined wormshaft portion 18 thereby causing the wormshaft 14 to revolve simultaneously. The torque balls 96' are preloaded to eliminate backlash between wormshaft 14 and bushing proper 88 in either direction of rotation. Efficient torque transfer is therefore possible from bushing proper to wormshaft. Both nontorque 96 and torque 96' balls function to make possible the relative axial motion of the wormshaft 14 and bushing proper 88 with rolling friction. It may be mentioned that the nontorque balls 96 and torque balls 96' can be of the same diameter and the same material; they are named differently solely because of the different functions assigned thereto.

Figures 9, 10:
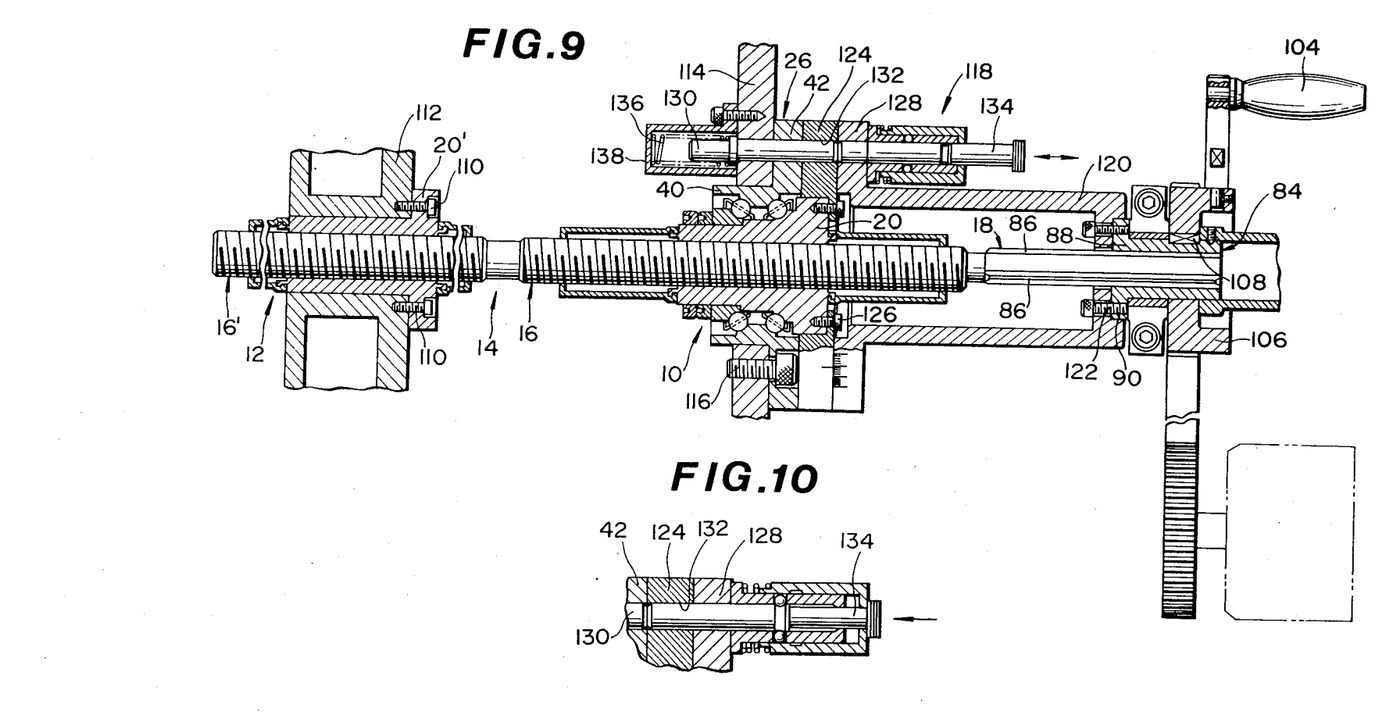
FIG. 9 is an axial section of the complete two-speed feed mechanism incorporating all the fundamental components seen in FIG. 1.
FIG. 10 is a fragmentary section through the speed selector mechanism in the feed mechanism of FIG. 9, the speed selector mechanism being shown activated to set the feed mechanism at a different speed.

FIG. 9 illustrates the dual rotary-to-linear converter assembly of FIG. 1 as actually fitted out for use as a two speed feed mechanism. The left hand end of the wormshaft 14 is assumed to be journaled in suitable bearing means, not shown, for both rotation and endwise motion. The splined right hand end portion 18 of the wormshaft is received as aforesaid in the ball bushing 84 and is coupled therethrough to drive means herein shown as a handle 104. This handle is affixed to a rimmed, centrally bored disc 106 which is keyed at 108 to the bushing proper 88. Thus the turning of the handle 104 results in the revolution of the wormshaft 14 about its own axis. The wormshaft is of course movable endwise relative to the ball bushing 84.

The ball nut 20' of the second rotary-to-linear converter 12 is screwed at 110 to a desired object to be fed, such as a worktable 112. By being thus fastened to the worktable the ball nut 20' is locked against rotation but is free to travel axially therewith.

The ball nut 20 of the first rotary-to-linear converter 10, on the other hand, is coupled via the double-row ball bearing 26 to some stationary part 114 such as a frame or housing; that is, the outer ring 40 of the bearing has its mounting flange 42 fastened to the stationary part 114 with countersunk screws 116. Consequently the ball nut 20 is incapable of axial motion relative to the stationary part 114. The reference numeral 118 generally designates a speed selector mechanism for selectively locking the ball nut 20 against rotation relative to the stationary part 114 and connecting the ball nut 20 to the ball bushing 84 for joint rotation therewith. The speed selector mechanism 118 comprises:

1. A sleeve 120 concentrically surrounding the wormshaft 14 with clearance and having its right hand end screwed at 122 to the flange 90 of the bushing proper 88.
2. A collar 124 screwed at 126 to the ball nut 20 and slidably sandwiched between the mounting flange 42 on the bearing outer ring 40 and a flange 128 on the left hand end of the sleeve 120.
3. A first lockpin 130 slidably extending through the stationary part 114 and the bearing outer ring flange 42 for movement into and out of a hole 132 formed through the ball nut collar 124.
4. A second lockpin 134 slidably extending through the sleeve flange 128 and also movable into and out of the hole 132 in the ball nut collar 124.

In the state of the speed selector mechanism 118 depicted in FIG. 9 the first lockpin 130 is engaged in the hole 132 in the ball nut collar 124 under the bias of a compression spring 136 housed in an enclosure 138. Thus is the ball nut 20 locked against rotation relative to the stationary part 114. The sleeve 120 is then rotatable with the ball bushing 84 and therefore with the wormshaft 14, in sliding contact with the ball nut collar 124. In FIG. 10 is shown the second lockpin 134 depressed against the bias of the compression spring 136. The first lockpin 130 is then withdrawn from the hole 132 in the ball nut collar 124; instead, the second lockpin 134 is engaged in the hole 132. Now the ball nut 20 is coupled to the sleeve 120 for joint rotation with the ball bushing 84 and the wormshaft 14.

Given hereunder is the operational description of the two-speed feed mechanism constructed as in FIG. 9. The operational description presupposes that: (1) the first threaded portion 16 of the wormshaft has a greater lead than that of the second threaded portion 16'; and (2) the threads of these wormshaft portions 16 and 16' are both cut right-handed.

Let us first assume that the speed selector mechanism 118 is in the state of FIG. 9, with the ball nut 20 of the first rotary-to-linear converter 10 locked against rotation (as well as against axial motion). As the operator turns the handle 104 in a clockwise direction, the torque is imparted to the wormshaft 14 via the ball bushing 84, causing revolution of the wormshaft in the same direction. Although the sleeve 120 also revolves with the ball bushing 84, its flange 128 merely slides over the ball nut collar 124, so that the ball nut 20 of the first rotary-to-linear converter 10 remain stationary. Accordingly the clockwise revolution of the wormshaft 14 results in its own axial motion, to the left as viewed in FIG. 9, relative to the fixed ball nut 20.

The ball nut 20' of the second rotary-to-linear converter 12, on the other hand, is locked against rotation but is free to travel axially with the worktable 112. With the clockwise rotation of the wormshaft 14, therefore, the ball nut 20' travels rightwardly relative to the wormshaft. Suppose that the lead of the first threaded portion 16 of the wormshaft is 10 millimeters, and that of the second threaded portion 16' nine millimeters. Then the wormshaft 14 is traveling leftwardly relative to the fixed ball nut 20 at a rate of 10 millimeters per revolution whereas the ball nut 20' is traveling rightwardly relative to the wormshaft at a rate of nine millimeters per revolution of the latter. Consequently, relative to the stationary part 114, for example, the ball nut 20' together with the worktable 112 thereon moves to the left at a rate of only one millimeter per revolution of the wormshaft 14.

Upon completion of its leftward stroke at the low speed the worktable 112 can be returned to the initial right hand position at a much higher speed. For such quick return the second lockpin 134 may be depressed against the bias of the compression spring 136 to the position pictured in FIG. 10. Then the handle 104 may be turned clockwise as above. The torque is imparted not only to the wormshaft 14 but also, via the sleeve 120 and the collar 124, to the ball nut 20 of the first rotary-to-linear converter 10. Since the wormshaft 14 and the ball nut 20 revolve in the same direction and at the same angular speed, there is no relative rotation and, therefore, no relative axial motion therebetween.

The clockwise rotation of the wormshaft 14 causes the ball nut 20' of the second rotary-to-linear converter 12 to travel rightwardly of the shaft together with the worktable 112 thereon. The wormshaft 14 is now stationary in its longitudinal direction, so that the speed of the rightward travel of the ball nut 20' depends only on the lead of the second threaded portion 16', aside from the rate of rotation of the wormshaft. In the present case, therefore, the worktable 112 moves on its rightward return stroke at a rate of nine millimeters per revolution of the wormshaft.

Although it has already been stated, it must be borne in mind that the two-speed feed mechanism disclosed herein has been selected with the thought of pictorially presenting a typical application of the worm-and-ball-nut type rotary-to-linear converter in accordance with the invention. Additional applications of the invention will readily occur to one skilled in the art without departing from the scope of the invention.

What is claimed is:
1. A rotary-to-linear converter comprising:
   (a) a worm having an external screw thread;
   (b) a ball nut having an internal screw thread and sleeved upon the worm;
   (c) a plurality of antifriction balls rollably interposed between the worm and the ball nut to cause relative longitudinal displacement of either in response to the rotation of the other;
   (d) at least one turn of the internal thread at the midportion of the ball nut being different in width from the other turns of the internal thread whereby the antifriction balls on the opposite sides of the different-width turn of the thread are preloaded in the opposite axial directions of the worm and the ball nut to eliminate backlash therebetween; and
   (e) a cage for rollably holding the balls in preassigned relative positions.

2. A rotary-to-linear converter as recited in claim 1, wherein the cage is in the form of a tube having formed therein a plurality of bores each loosely receiving one of the antifriction balls.

3. A rotary-to-linear converter as recited in claim 1, wherein the ball nut has a pair of tubular extensions projecting coaxially from its opposite axial ends.

4. A rotary-to-linear converter as recited in claim 3, wherein the pair of extensions of the ball nut have blank inside surfaces adapted for point contact with the antifriction balls.

5. A rotary-to-linear converter as recited in claim 3, wherein each extension of the ball nut has an annular rim directed inwardly from its end away from the ball nut, each rim being slidably engaged with the thread of the worm to prevent intrusion of foreign matter.

6. A rotary-to-linear converter as recited in claim 1, further comprising an antifriction bearing having the ball nut adapted to serve as an inner ring, the bearing further comprising:
 (a) an outer ring around the ball nut; and
 (b) a plurality of rolling elements confined between the ball nut and the outer ring.

7. A rotary-to-linear converter as recited in claim 6, wherein the rolling elements are arranged in two rows and the ball nut has formed therein a race for one row of rolling elements, and wherein the bearing further comprises:
 (a) an inner ring segment closely fitted over the ball nut and having formed therein a race for the other row of rolling elements; and
 (b) retainer means for retaining the inner ring segment in position on the ball nut, the retainer means being effective to urge the inner ring segment in such an axial direction of the ball nut that the inner ring segment coacts with the ball nut and the outer ring to preload the two rows of rolling elements toward each other.

8. A rotary-to-linear converter as recited in claim 6, wherein the rolling elements are arranged in two rows, and wherein the outer ring comprises a plurality of segments coacting with the ball nut to preload the two rows of rolling elements toward each other.

9. A rotary-to-linear converter as recited in claim 6, wherein the rolling elements are arranged in two rows, and wherein the outer ring comprises a plurality of segments coacting with the ball nut to preload the two rows of rolling elements away from each other.

10. A dual rotary-to-linear converter assembly comprising:
 (a) a wormshaft having at least two externally screw-threaded portions, the threads of the two threaded portions having different leads;
 (b) a plurality of ball nuts each having a single internal screw thread and sleeved upon the threaded portions of the wormshaft;
 (c) a group of antifriction balls rollably engaged between each threaded portion of the wormshaft and the corresponding one of the ball nuts, at least one turn of the thread at the midportion of each ball nut being different in width from the other turns whereby the antifriction balls on the opposite sides of the different-width turn of the thread are preloaded in each group in the opposite axial directions of the wormshaft and the ball nut to eliminate backlash therebetween; and
 (d) a cage for rollably holding each group of antifriction balls in preassigned relative positions.

11. A dual rotary-to-linear converter assembly as recited in claim 10, further comprising an antifriction bearing on one of the ball nuts, said one ball nut being adapted to serve as an inner ring of the bearing.

12. A dual rotary-to-linear converter assembly as recited in claim 10, wherein the wormshaft is formed to include a straight-splined portion.

13. A mechanism capable of feeding and returning an object at two different speeds by being mounted to a stationary part, comprising:
 (a) a wormshaft having first and second externally screw-threaded portions and a straight-splined portion, the threads of the two threaded portions having different leads;
 (b) first and second ball nuts each having a single internal screw thread and being sleeved upon the first and second threaded portions, respectively, of the wormshaft, the second ball nut being adapted to be coupled to the object thereby to be restrained from rotation relative to the stationary part;
 (c) two groups of antifraction balls rollably engaged between the first and second threaded portions of the wormshaft and the first and second ball nuts, respectively, at least one turn of the thread at the midportion of each ball nut being different in width from the other turns whereby the antifriction balls on the opposite sides of the different-width turn of the thread are preloaded in each group in the opposite axial directions of the wormshaft and the ball nut to eliminate backlash therebetween;
 (d) a cage for rollably holding each group of antifriction balls in preassigned relative positions;
 (e) an antifriction bearing for rotatably supporting the first ball nut on the stationary part whereby the first ball nut is restrained from axial motion relative to the stationary part;
 (f) a ball bushing fitted over the straight-splined portion of the wormshaft for joint rotation therewith while admitting of its axial motion;
 (g) drive means acting on the ball bushing to cause rotation of the wormshaft; and
 (h) speed selector means for selectively locking the first ball nut against rotation relative to the stationary part and connecting the first ball nut to the ball bushing for joint rotation therewith;
 (i) whereby when the first ball nut is locked against rotation relative to the stationary part, the rotation of the wormshaft results in the axial motion of the second ball nut at a speed, relative to the stationary part, corresponding to the difference between the leads of the first and second threaded portions of the wormshaft, and when the first ball nut is connected to the ball bushing for joint rotation therewith, the rotation of the wormshaft results in the axial motion of the second ball nut at another speed corresponding to the lead of the second threaded portion of the wormshaft.

14. A two-speed feed mechanism as recited in claim 13, wherein the speed selector means comprises:
 (a) a sleeve concentrically surrounding the wormshaft and rigidly coupled at one end to the ball bushing for joint rotation therewith, the sleeve having a flange on another end;
 (b) a collar rigidly formed on the first ball nut;
 (c) a first lockpin slidably extending through the stationary part and movable into and out of a hole formed through the collar on the first ball nut;
 (d) resilient means urging the first lockpin into the hole in the collar for locking the first ball nut against rotation relative to the stationary part; and (e) a second lockpin slidably extending through the flange on the sleeve and also movable into and out of the hole in the collar, the second lockpin being adapted to be pushed into the hole in the collar against the force of the resilient means for causing joint rotation of the first ball nut with the ball bushing.

15. A two-speed feed mechanism as recited in claim 13, wherein the first ball nut is adapted to serve as an inner ring of the antifriction bearing.

* * * * *